United States Patent [19]
Hrovat

[11] Patent Number: 5,517,414
[45] Date of Patent: May 14, 1996

[54] TRACTION CONTROL SYSTEM WITH ACTIVE SUSPENSION

[75] Inventor: Davorin D. Hrovat, Dearborn, Mich.

[73] Assignee: Ford Motor Company, Dearborn, Mich.

[21] Appl. No.: 316,951

[22] Filed: Oct. 3, 1994

[51] Int. Cl.[6] .......................... B60G 17/00; B60K 28/10
[52] U.S. Cl. .................. 364/424.05; 364/426.03; 180/197
[58] Field of Search ........................ 364/426.02, 426.03, 364/424.05; 303/95, 100, 139, 163, 150, 187; 180/197; 280/707

[56] References Cited

U.S. PATENT DOCUMENTS

| | | | |
|---|---|---|---|
| 3,921,446 | 11/1975 | Ludloff | 73/136 R |
| 4,680,959 | 7/1987 | Henry et al. | 73/117 |
| 4,712,635 | 12/1987 | Sumiya et al. | 180/197 |
| 4,721,176 | 1/1988 | Kabasin et al. | 180/197 |
| 4,733,760 | 3/1988 | Inagaki et al. | 192/3 R |
| 4,758,967 | 7/1988 | Shmuter et al. | 364/550 |
| 4,771,848 | 9/1988 | Namba et al. | 180/197 |
| 4,779,202 | 10/1988 | Leiber | 364/426.03 |
| 4,803,630 | 2/1989 | Takizawa et al. | 364/424.05 |
| 4,805,102 | 2/1989 | Ise et al. | 364/424.05 |
| 4,809,183 | 2/1989 | Eckert | 364/426.04 |
| 4,811,808 | 3/1989 | Matsumoto et al. | 180/197 |
| 4,821,606 | 4/1989 | Leiber | 74/866 |
| 4,850,446 | 7/1989 | Leiber et al. | 180/197 |
| 4,872,117 | 10/1989 | Suzuki et al. | 364/431.05 |
| 4,985,838 | 1/1991 | Hashiguchi et al. | 364/424.02 |
| 5,033,002 | 7/1991 | Sol | 364/426.03 |
| 5,033,573 | 7/1991 | Hrovat | 180/197 |
| 5,043,896 | 8/1991 | Sol | 364/426.02 |
| 5,044,660 | 9/1991 | Yamamura et al. | 280/707 |
| 5,069,302 | 12/1991 | Kageyama | 180/197 |
| 5,090,511 | 2/1992 | Kabasin | 180/197 |
| 5,159,991 | 11/1992 | Tsuyama et al. | 180/197 |
| 5,164,902 | 11/1992 | Kopper et al. | 364/426.02 |
| 5,193,888 | 3/1993 | Okazaki et al. | 303/93 |
| 5,228,719 | 7/1993 | Fukuyama et al. | 280/707 |
| 5,278,761 | 1/1994 | Ander et al. | 364/426.03 |
| 5,383,123 | 1/1995 | Kunz | 364/424.05 |

Primary Examiner—Michael Zanelli
Attorney, Agent, or Firm—Allan J. Lippa; Roger L. May

[57] ABSTRACT

An active suspension system (12, 82a-d), coupled to each wheel of a motor vehicle is controlled to minimize or reduce wheel slippage. In response to detection of wheel slippage, the normal force applied to the slipping wheel is increased and the normal force applied to the wheel laterally opposite the slipping wheel is concurrently decreased (steps 240-384). The changes in normal force are limited to prevent inducing a wheel slip in the laterally opposite wheel (step 278-284). An engine controller (70) concurrently reduces engine torque to further reduce wheel slip.

5 Claims, 8 Drawing Sheets

TRACTION CONTROL SYSTEM WITH ACTIVE SUSPENSION

BACKGROUND OF THE INVENTION

The field of the invention relates to controlling the wheel slip of a driven wheel coupled to an internal combustion engine.

U.S. Pat. No. 5,033,573 discloses a motor vehicle having an active suspension coupled to each of the vehicle's wheels. In response to detection of wheel slip, such as may occur during acceleration or when encountering a slippery surface, the active suspension system applies a normal force to the slipping wheel. In addition, an engine controller decreases engine torque in response to the wheel slip detection.

The inventors herein have recognized numerous problems with the above approach. For example, the active suspension system may apply a normal force to the slipping wheel only for a finite time duration which is limited by the amount of deflection the suspension system can generate.

SUMMARY OF THE INVENTION

An object of the invention claimed herein is to control wheel slip applying an increased normal force to the slipping wheel by an active suspension for a sufficient time period to reduce or eliminate the wheel slip.

The above object is achieved, and the problems and disadvantages of prior approaches overcome, by providing both a method and feedback control system for controlling wheel slip of a motor vehicle having an active suspension system applying a normal force to each wheel of the motor vehicle. In one particular aspect of the invention, the method comprises the steps of: detecting wheel slip of one of the wheels; and increasing the normal force applied from the suspension system to the slipping wheel and concurrently decreasing the normal force to the wheel laterally opposite the slipping wheel in response to the wheel slip detection.

An advantage of the above aspect of the invention is that the normal force applied to the slipping wheel may be increased for an indefinite time duration. Accordingly, the normal force may be applied for a time sufficient to substantially reduce or eliminate the wheel slipping thereby overcoming a disadvantage or problem of the prior approaches.

In another aspect of the invention, the systems comprises: an active suspension system for applying a normal force to each wheel; a wheel slip detector coupled to each of the wheels; an active suspension controller increasing the normal force applied to a detected slipping wheel and the wheel diagonally opposite the slipping wheel, the active suspension controller concurrently decreasing the normal force applied to the wheels both laterally opposite and longitudinally opposite the slipping wheel; a limiter limiting the decrease in normal force to prevent slipping of the laterally opposite wheel; and an engine controller for decreasing engine torque in response to the wheel slip detection.

An advantage of the above aspect of the invention is that a normal force is applied by the active suspension to the slipping wheel for a sufficient time to reduce or eliminate wheel slip. Another advantage of the above aspect of the invention, is that the counter balancing decrease in normal force applied to the laterally opposite wheel is limited to prevent induced slipping of that wheel. Still another advantage of the above aspect of the invention is that the engine is concurrently controlled to reduce wheel slip.

BRIEF DESCRIPTION OF THE DRAWINGS

The above objects and advantages are better understood by reading an example of an embodiment which utilizes the invention to advantage with reference to the drawings wherein.

DESCRIPTION OF THE PREFERRED EMBODIMENT

Figure 1:
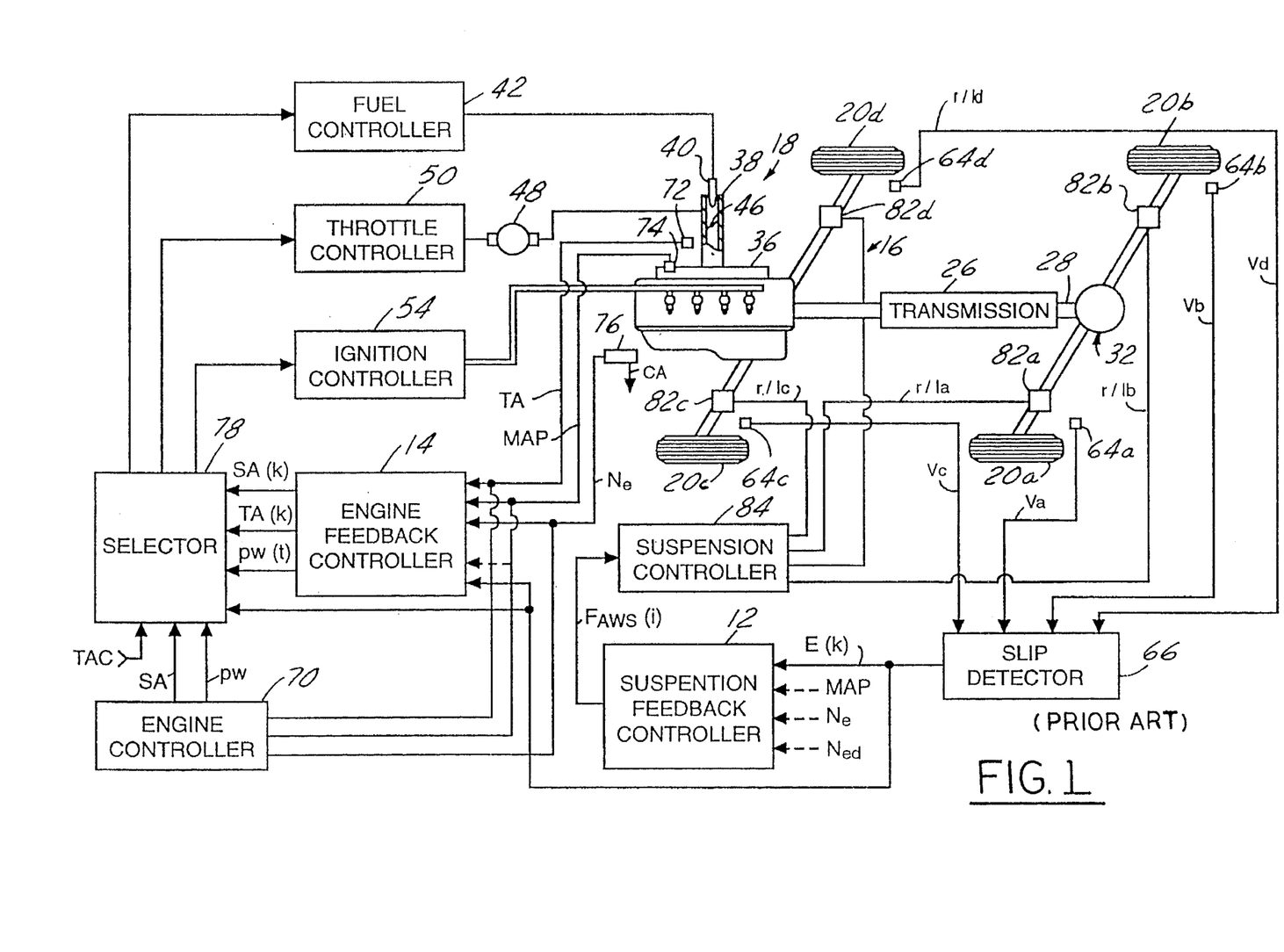
FIG. 1 is a block diagram showing a conventional motor vehicle coupled to the feedback control systems described herein.

Referring first to FIG. 1, in general terms which are described in greater detail hereinafter, suspension feedback controller 12 and engine feedback controller 14 are shown as feedback control systems receiving inputs from, and controlling, motor vehicle 16 when detected wheel slip exceeds a desired or preselected value.

Motor vehicle 16 is shown in this particular example having an internal combustion engine 18 coupled to drive wheels 20a and 20b, transmission/torque convertor 26, driveshaft 28 and differential/axle 32. Although a conventional rear wheel drive vehicle is shown in the example of FIG. 1, the invention is also used to advantage with front wheel drive and four-wheel drive vehicles.

Engine 18 is shown in this example including an intake manifold 36 for inducting an air/fuel mixture therein via air/fuel intake 38. Fuel injector 40, shown as a portion of a central fuel injected system in this example, injects fuel into air/fuel intake 38 under control of conventional fuel controller 42. Throttle plate 46 is here shown actuated by servo motor 48 in response to throttle controller 50 for adjusting flow through air/fuel intake 38 in a conventional manner. Conventional ignition controller 54 is shown providing ignition timing and appropriate ignition spark to spark plugs 56, 58, 60 and 62.

It is to be understood that the feedback control systems described herein may be used to advantage with any type of combustion engine such as, for example, carbureted engines, multiport fuel injected engines, and direct fuel injected engines. Further, the feedback control systems are not limited to automobiles, but may be used to advantage with any apparatus having an engine coupled to a drive wheel such as, for example, a motorcycle.

Wheel speed sensors 64a and 64b are shown coupled to respective wheels 20a and 20b for providing slip detector 66 with corresponding wheel speed signals Va and Vb. Similarly, wheel speed sensors 64c and 64d are shown coupled to respective wheels 20c and 20d for providing slip detector 66 with corresponding speed signals Vc and Vd. Slip detector 66 determines if the slippage of any wheel is beyond a threshold value such as 20% slippage and in response, provides error signal E(k) each sample instant k. In this particular example, the derivative of wheel speed is taken to determine excess wheel slippage. A simple comparison of driven wheel speed to nondriven wheel speed could also be used to determine excessive slippage. For example, a simple velocity comparison of driven wheel 20a to nondriven wheel 20c may be used to determine excess wheel slippage. In other embodiments, commercially available Doppler radar units have been used to advantage.

As described in greater detail later herein, engine feedback controller 14 provides spark advance signal SA(k), sampled throttle angle signal TA(k), and sampled fuel pulse width signal pw(k). Engine feedback controller 14 is shown being responsive to signal E(k) from slip detector 66, throttle angle signal TA from throttle angle sensor 72, manifold pressure signal MAP from manifold pressure sensor 74, and engine speed signal Ne from rotation sensor 76.

In this particular example, conventional engine controller 70 is shown providing spark advance signal SA and fuel pulse width signal pw to selector 78. Throttle angle command signal $T_{AC}$ from a conventional driver actuable throttle is also shown coupled to selector 78.

In response to signal E(k) from slip detector 76, selector 78 selects either $T_{AC}$, SA, and pw, or the corresponding feedback signals SA(k), TA(k) and pw(k). Stated another way, when wheel slip is below a threshold value, selector 78 selects signals from engine controller 70 and the driver actuable throttle. When wheel slip is above a threshold value, selector 78 selects signals from engine feedback controller 14 such that wheel slip is reduced by engine control as described in greater detail later herein.

Continuing with FIG. 1, motor vehicle 16 is shown having an active suspension system including hydraulic assemblies 82a, 82b, 82c, and 82d coupled to respective wheels 20a, 20b, 20c, and 20d. Each hydraulic assembly is shown actuated by separate raise/lower command signals r/1a, r/1b, r/1c, and r/1d from suspension controller 84. For this particular example, suspension controller 84 is responsive to anti-wheel slip force signal $F_{aws}(j)$ from suspension feedback controller 12. Active suspension systems other than the one shown herein may be used to advantage. For example, a hydraulic assembly may be positioned in parallel with a mechanical or pneumatic spring.

Figure 2:
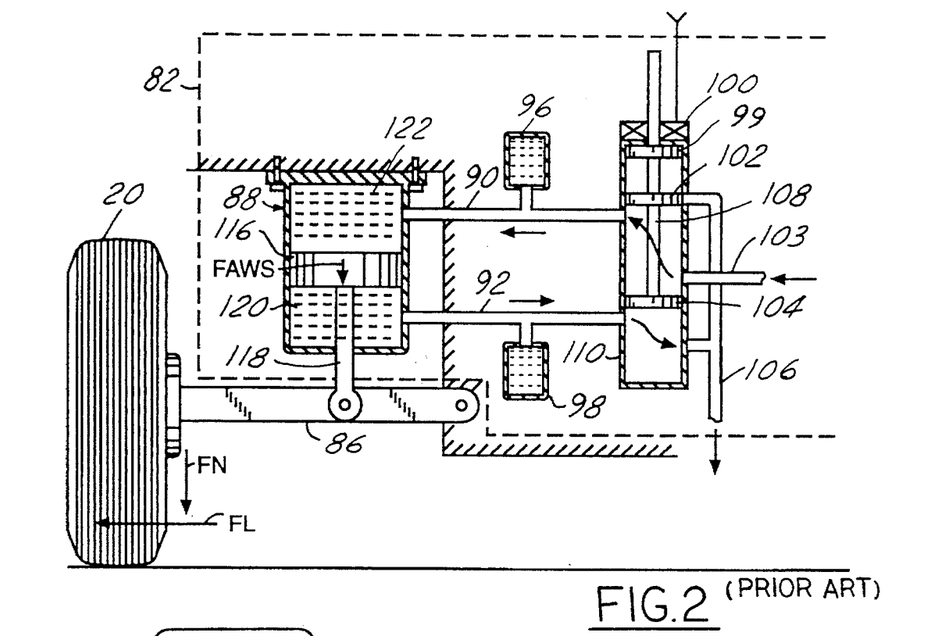
FIG. 2 shows a portion of the embodiment shown in FIG. 1 relating to hydraulic control of the vehicle's wheels.

Referring to FIG. 2, each hydraulic assembly 82 is shown coupled to a wheel 20 via suspension arm 86. Hydraulic assembly 82 is shown including hydraulic actuator 88 coupled to servo valve 94 via hydraulic lines 90 and 92. Hydraulic accumulators 96 and 98 are shown respectively coupled to hydraulic lines 90 and 92. Servo valve 94 is shown coupled to hydraulic supply line 103 and hydraulic return line 106 each of which are coupled to a conventional hydraulic pump (not shown) and accumulator (not shown).

Servo valve 94 is shown including armature 98 electromagnetically coupled to coils 100 which are connected to signal r/1. Armature 99, and valve assemblies 102 and 104, are shown coupled to shaft 108 within housing 110. Shaft 108 is also coupled to return spring 112 (not shown) for supplying a counteractive force to coils 100. Hydraulic actuator 88 is shown including piston 116 coupled to suspension arm 86 via rod 118. Piston 116 is positioned within chamber 120 effectively dividing it into upper chamber 122 and lower chamber 124. Chambers 122 and 124 are shown respectively coupled to hydraulic lines 90 and 92.

In operation, when signal r/1 is active, armature 98 of servo valve 94 is attracted to coils 100. In response, valves 102 and 104 are positioned as shown in FIG. 2 thereby coupling supply line 103 to upper chamber 122 via hydraulic line 90 and coupling lower chamber 120 to return line 106 via hydraulic line 92. Accordingly, piston 16 deflects downwardly exerting both a downward normal force and lateral force (unless vehicle is traveling in a straight line) against wheel 20 via suspension arm 86. When signal r/1 is inactive, return spring 112 (not shown) positions valve assemblies 102 and 104 such that lower chamber 124 is coupled to supply line 103 and upper chamber 122 is coupled to return line 106. In response, piston 16 deflects upwardly thereby exerting an upward force on wheel 20.

Figure 3:
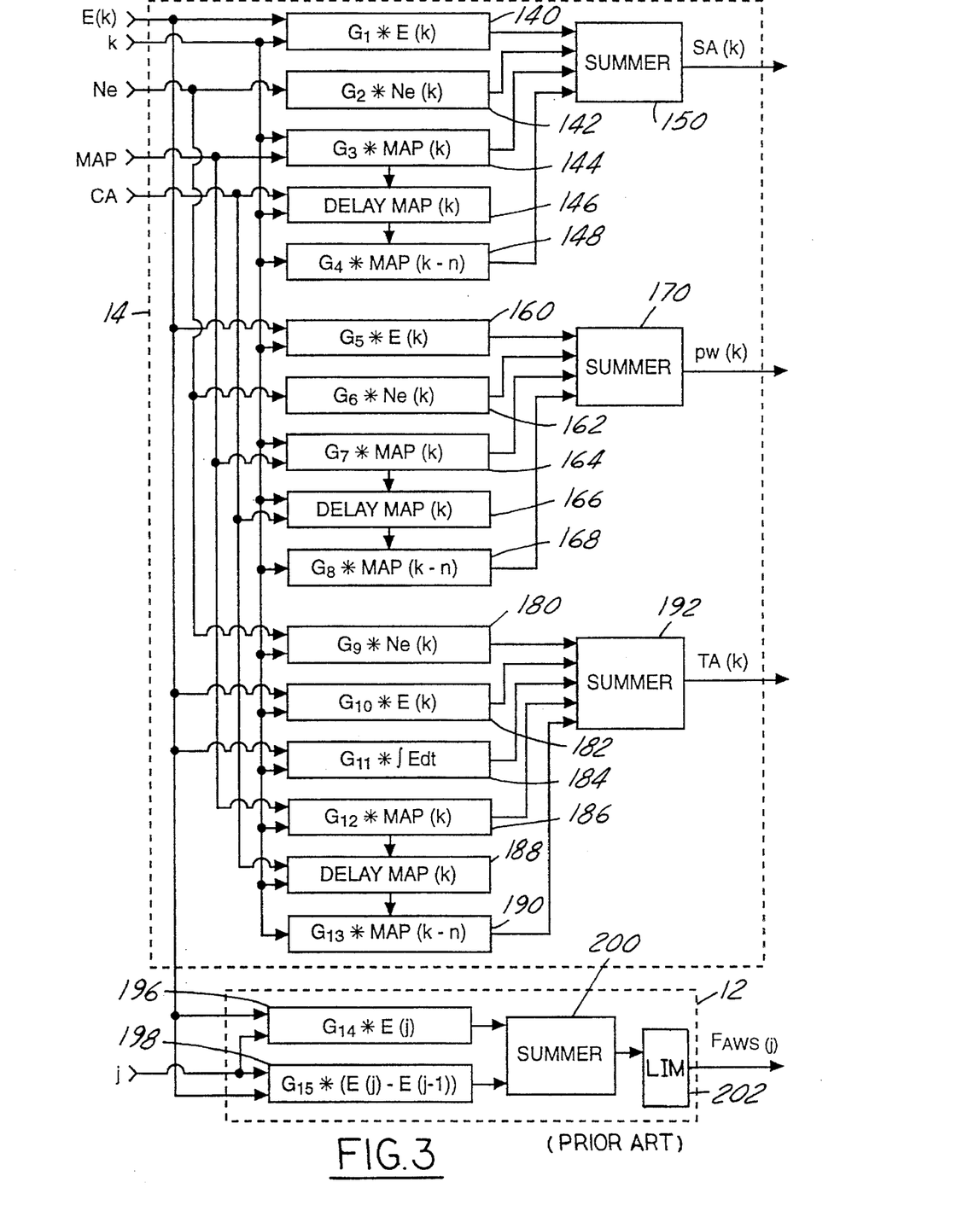
FIGS. 3, 4, 5A, 5B, 6A, 6B, and 6C are flowcharts of the process steps performed by the control systems shown in FIG. 1.

Referring now to FIG. 3, and also referring back to FIG. 1, feedback suspension controller 12 and engine feedback controller 14 are shown schematically as a flowchart of computational and decision making steps represented as blocks. Each block shown herein describes an operation performed by the feedback controllers. It is noted that these operations may also be performed by discrete components wherein each block would comprise an array of circuits such as, for example, IC adders and IC multipliers.

A description of feedback engine controller 14 is first provided. More specifically, error signal E(k) is multiplied by gain constant $G_1$ in step 140 once each sample period to generate feedback variable $G_1*E(k)$ related to wheel slip. Feedback variable $G_2*N_e(k)$ is shown generated by multiplication of gain constant $G_2$ times engine speed NE once sample period in step 142. During step 144, manifold pressure signal MAP is multiplied by gain constant $G_3$ each sample period to generate feedback variable $G_3*MAP(k)$. It is noted that manifold pressure signal MAP provides a measurement of engine torque output before the torque is actually delivered by engine 18. Thus, feedback variable $G_3*MAP(k)$ provides engine feedback controller 14 with a faster and more stable response time than heretofore possible. Referring to steps 146 and 148, sampled signal MAP(k) is delayed for an integer number of engine cycles (n) such that feedback variable $G_4*MAP(k-n)$ corresponds with the actual torque delivered by engine 18. The feedback variables generated by steps 140, 142, 144, and 148 are summed in summer 150 to generate feedback control signal SA(k) as shown by the following equation:

$$SA(k)=G_1*E(k)+G_2*Ne(k)+G_3*MAP(k)+G_4*MAP (k-n)$$

Referring to steps 160, 162, 164, 166, 168, and 170 feedback control signal pw(k) is generated in a manner similar to the generation of feedback control signal SA(k) described above. The pulse width of feedback control signal pw(k) controls fuel delivery by fuel injector 40 such that engine torque is reduced in response to a detection of wheel slip. Feedback control signal pw(k) is represented by the following equation:

$$pw(k)=G_5*E(k)+G_6*Ne(k)+G_7*MAP(k)+G_8*MAP (k-n)$$

During steps 180 and 182, feedback variable Ne(k) is multiplied by gain constant $G_9$ and feedback variable E(k) is multiplied by gain constant $G_{10}$. Feedback variable E(k) is also stored each sample period and successive stored values added to form the integral of E(k). This integral value is than multiplied by gain constant $G_{11}$ each sample period to generate feedback variable $G_{11}*\int Edt$ during step 184. Feedback variable MAP(k) is multiplied by gain constant $G_{12}$ during step 186 to generate feedback variable $G_{12}*MAP(k)$. Feedback variable MAP(k) is then delayed by an integer number of combustion cycles such that feedback variable $G_{13}*MAP(k-n)$ is generated to correlate with actual delivery of engine torque as shown by steps 188 and 190. Each of these feedback variables is summed each sample period in summer 192 to generate feedback control signal TA(k) as shown by the following equation:

$$TA(k)=G_9*Ne(k)+G_{10}*E(k)+G_{11}*\int Edt+G_{12}*MAP (k)+G_{13}*MAP(k-n)$$

Feedback control system TA(k) controls the engine throttle during a wheel slip condition for reducing engine torque and, accordingly, wheel slip.

It is noted that feedback control signals TA(k), pw(k), and SA(k) reduce engine torque output as a function of the above feedback variables. Since manifold pressure signal MAP is used as a feedback variable, an indication of engine torque output is provided before the torque is actually delivered by engine 18. Accordingly, engine feedback controller 14 provides a faster and more stable response than heretofore possible.

Figure 4:
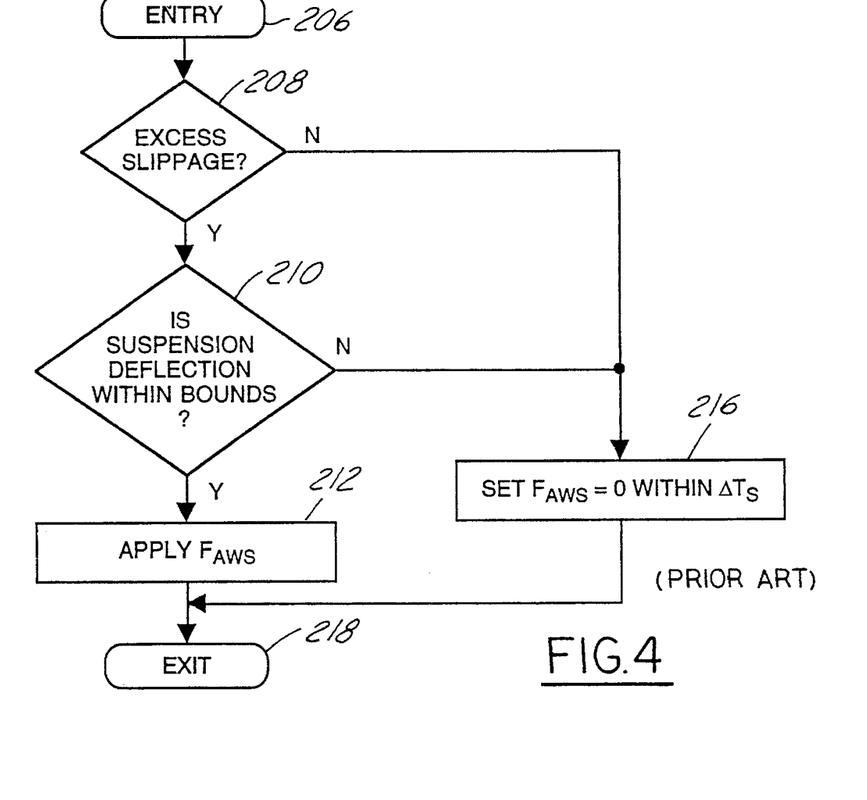

Continuing with FIG. 3, and also referring to FIG. 4, the operation of suspension feedback controller 12 is now described. During process step 196, error signal E is sampled once each sample interval j and multiplied by gain constant $G_{14}$. Each sample period error signal E is also stored for adding the stored value to the subsequent sampled error signal (see step 198). The difference between error signals from two successive samples is then taken and multiplied by gain constant $G_{15}$ to generate feedback variable $G_{15}*[E(j)-E(j-1)]$. Thus, a proportional derivative feedback variable is formed. Both feedback variables are summed in summer 200 to generate anti-wheel slip control signal $F_{aws}(j)$ as shown as the following equation:

$$F_{aws}(j)=G_{15}*E(j)+G_{15}*[E(j)-E(j-1)]$$

Normal force feedback control signal $F_{aws}$ is an incremental force applied by the active suspension system to reduce wheel slippage. It is limited by limiting switch 202 as described with particular reference to FIG. 4. More specifically, when excess wheel slip is detected (see step 208), and deflection of hydraulic actuator 88 is within predetermined limits (see step 210), then feedback control signal $F_{aws}(j)$ is coupled to suspension controller 84. If the conditions of step 208 or step 210 are not present, then feedback control signal $F_{aws}(j)$ is set to zero within a predetermined time $\Delta T_S$ as shown in step 216. Thus, in response to a detection of excess wheel slip, feedback control signal $F_{aws}(j)$ is applied to hydraulic assemblies 82 only until the maximum deflection of the hydraulic assembly has incurred. After the maximum deflection of hydraulic assembly 82 has been reached, feedback control signal $F_{aws}(j)$ is set to zero. In operation, the force $F_{aws}$ applied via hydraulic assemblies 82 results in both a downward normal force $F_N$ and lateral cornering force $F_L$ applied to each wheel $20_{a-d}$. The inventor herein has found that these incremental forces may be up to 1g during wheel slip conditions. Accordingly, the application of both a normal force $F_N$ and lateral or cornering force $F_L$ has resulted in greater vehicular stability during wheel slip conditions than heretofore possible. It is noted that the calculation of $F_{aws}(j)$ can be done either using the above feedback expression or as an open loop expression proportional to the weight carried by a wheel.

Figure 5A:
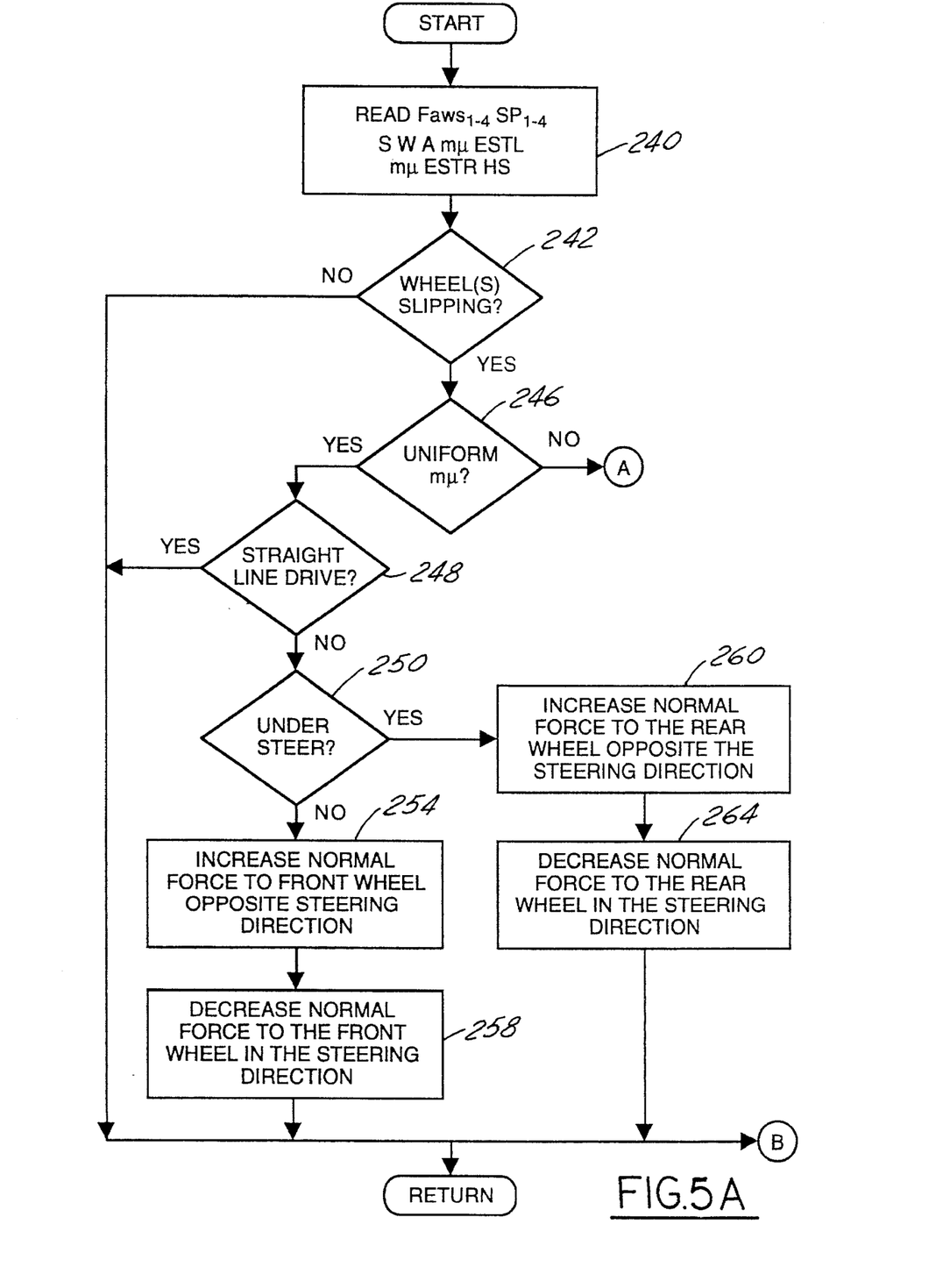
Figure 5B:
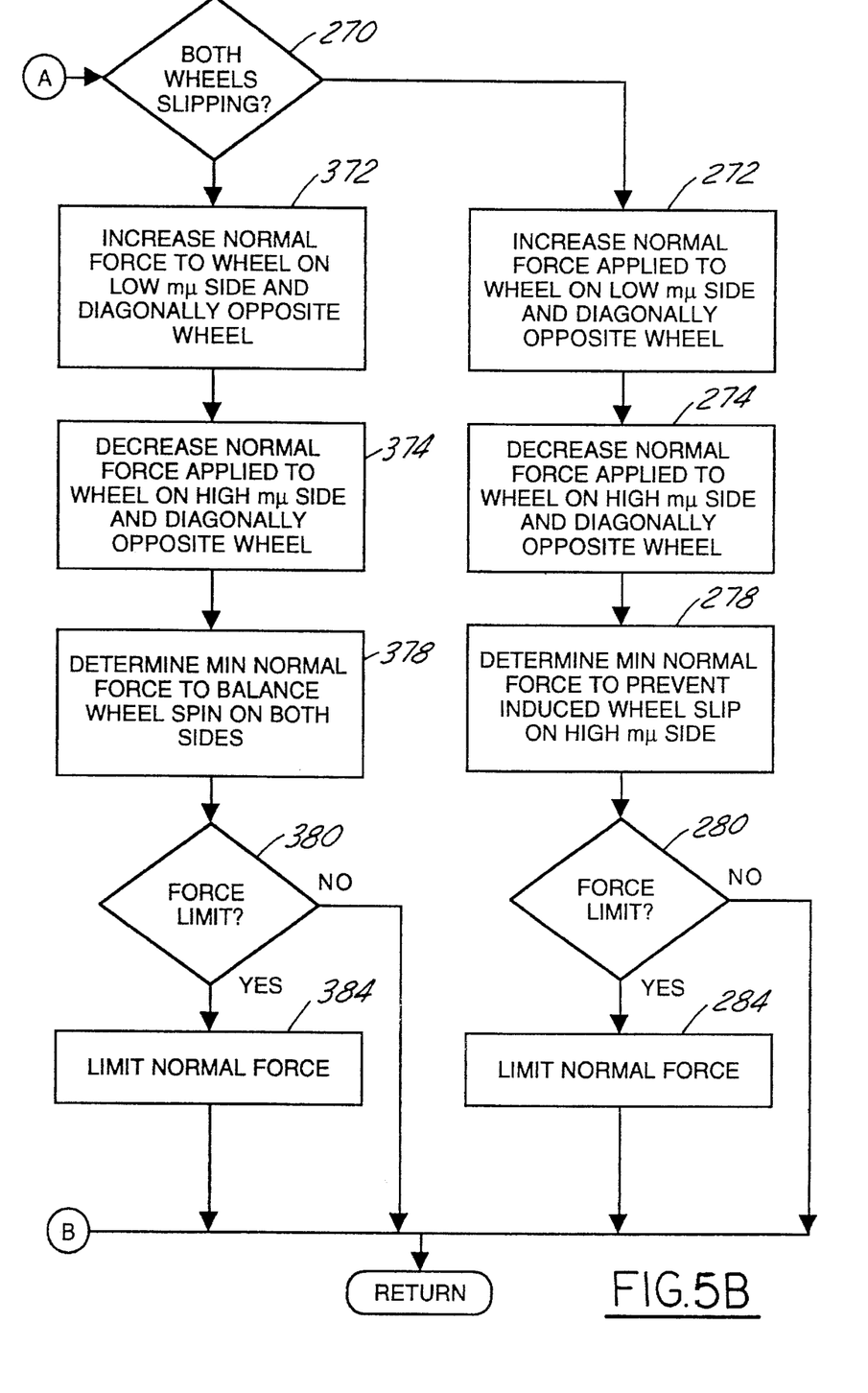

Referring now to FIGS. 5A–5B, AND 6A–6C, the subroutine executed by suspension feedback controller 12 for controlling hydraulic assemblies 82a, 82b, 82c, and 82d in response to wheel slip is now described. Referring first to FIGS. 5A–5B, various input parameters are read such as normal force control signals $Faws_{1-4}$, and wheel slip signals $WS_{1-4}$ from slip detector 66 which is proportional to the amount wheel slip for respective wheels 1–4. In addition, steering wheel angle SA, and estimates of the coefficient of road friction for the left and right side of the motor vehicle (muESTL and muESTR) are provided as described in the specification of U.S. Pat. No. 5,278,761 which is incorporated herein by reference. Further, an estimate of hill slope (HS) is provided as described in the specification of U.S. Pat. No. 5,043,896 which is also incorporated herein by reference.

After wheel slip of any of the wheels is detected as being greater than a threshold value such as 10% (step 242), the subroutine shown in FIGS. 5A–5B continues. In the event the coefficients of road friction for both sides of the motor vehicle are substantially the same (step 246), and the vehicle is driving in substantially a straight line (step 248), a determination of whether there is over or under steer is made in step 250. In the event of over steer (step 250), directional stability is enhanced by increasing the normal forced applied to the front wheel which is opposite the steering direction (step 254). Concurrently, the normal force which is applied to the front wheel in the steering direction is decreased by the same amount (step 258).

Similarly, in the case of vehicle under steer (step 250), the normal force to the rear wheel which is opposite the steering direction is increased (step 260). And the normal force applied to the rear wheel which is in the steering direction is decreased by the same amount (step 264). In this manner, vehicle control is enhanced during wheel slippage and under steering.

In the event that wheel slippage is detected (step 242), and the coefficient of road surface for both sides of the vehicle is not uniform (step 246), the following routine is executed to reduce wheel slippage and enhance vehicle control. When only one of the driven wheels is slipping (step 270), the normal force which is applied to the slipping wheel on the vehicle side having the low coefficient of road friction and its diagonally opposite wheel are increased by the same force (step 272). Concurrently, the normal force applied to the wheel on the vehicle side encountering the higher coefficient of road friction and its diagonally opposite wheel are decreased by the same amount as the previously stated increase (step 274).

Steps 278–284 are an example of a limiter which may be used to advantage for limiting the decrease in normal force on the wheel encountering the higher coefficient of road friction. Without such a limit, the decrease in normal force may induce wheel slippage of this wheel. In this particular example, the minimum normal force to prevent induced wheel slip is first calculated during step 278. The following torque equation may be used to advantage for such calculation.

$$\tau = muESTH * FN * \text{Wheel Radius}$$

If the normal force has not reached the above defined limit (step 280), the subroutine is exited such that the normal force may be further altered during a subsequent subroutine. On the other hand, if the normal force limit is reached (step 280), the decreases and corresponding increases in normal force are limited to the limit value (step 284).

Continuing with FIGS. 5A–5B, the subroutine is now described for controlling wheel slip when both driven wheels are slipping on a road surface having different, or split, coefficients of friction (step 270). In response to the above detection (steps 242, 246, and 270), the normal forces on the slipping wheel encountering the low coefficient of friction and its diagonally opposite wheel (step 372), are increased. Concurrently, the normal forces applied to the slipping wheel on the road surface having the higher coefficient of friction and its diagonally opposite wheel are decreased substantially the same amount as the previously described increase (step 374).

Steps 378–384 describe an example of limiting the above increase and decrease in normal forces to substantially balance wheel slippage of the two slipping wheels. Otherwise, without the below described limiting feature, the slipping wheel encountering the higher coefficient of road friction may be induced to have slippage greater than the wheel encountering the lower coefficient of friction. Continuing with this particular example, the minimum normal force to balance wheel slipping on both sides is first determined. In this example the following equation may be used to advantage (step 378).

$$FNl = FNh * muESTL/muESTH$$

Where:

FNh is the normal force on the wheel encountering the high coefficient of friction;

FNl is the normal force on the wheel encountering the low coefficient of friction;

muESTL is the lower road coefficient of friction; and muESTH is the higher coefficient of friction.

When the above described force limit is reached (step 380), the increases and decreases in normal forces are limited (step 384). On the other hand, when the force limit has not been reached (step 380), the subroutine is exited so that the normal forces may be further altered during a subsequent subroutine.

Subroutines are now described with reference to FIGS. 6A–6C for applications on vehicles having traction control achieved by both control of the engine and the brake system (ABS). Steps 340–364 are the same as previously described steps 240–264 in FIGS. 5A–5B wherein the 200 series numerals are replaced by the 300 series numerals in FIGS. 6A–6C. Accordingly, a description of these steps is not necessary. In general, steps 400–418 describe a subroutine for maximizing vehicle acceleration under certain conditions in the presence of wheel slippage. Steps 406, and 472–484 describe a subroutine for maximizing vehicle control or stability under certain vehicle operating conditions in the presence of wheel slippage.

Referring first to steps 400–418, acceleration is maximized while controlling wheel slippage when any of the following operations are detected: the motor vehicle is traveling at a low speed (step 400); the accelerator pedal is greater than a minimum angle (step 402); the vehicle is traveling in straight line (step 404); or the vehicle is traveling uphill (step 406).

In response to detection of any of the above operations the following subroutine is entered for maximizing acceleration while controlling wheel slip. During step 410, the maximum normal force corresponding to maximum engine torque which may be applied to the wheel encountering the higher coefficient of road friction without inducing a slippage of that wheel is first calculated. The same torque equation previously described with reference to step 278 in FIGS. 5A–5B is used to advantage in this particular example. The appropriate hydraulic assemblies (82a–82d) are then instructed to increase the normal force on the wheel encountering the higher coefficient of road friction and decrease the normal force on the wheel encountering the lower coefficient of road friction (step 414).

Figure 6A:
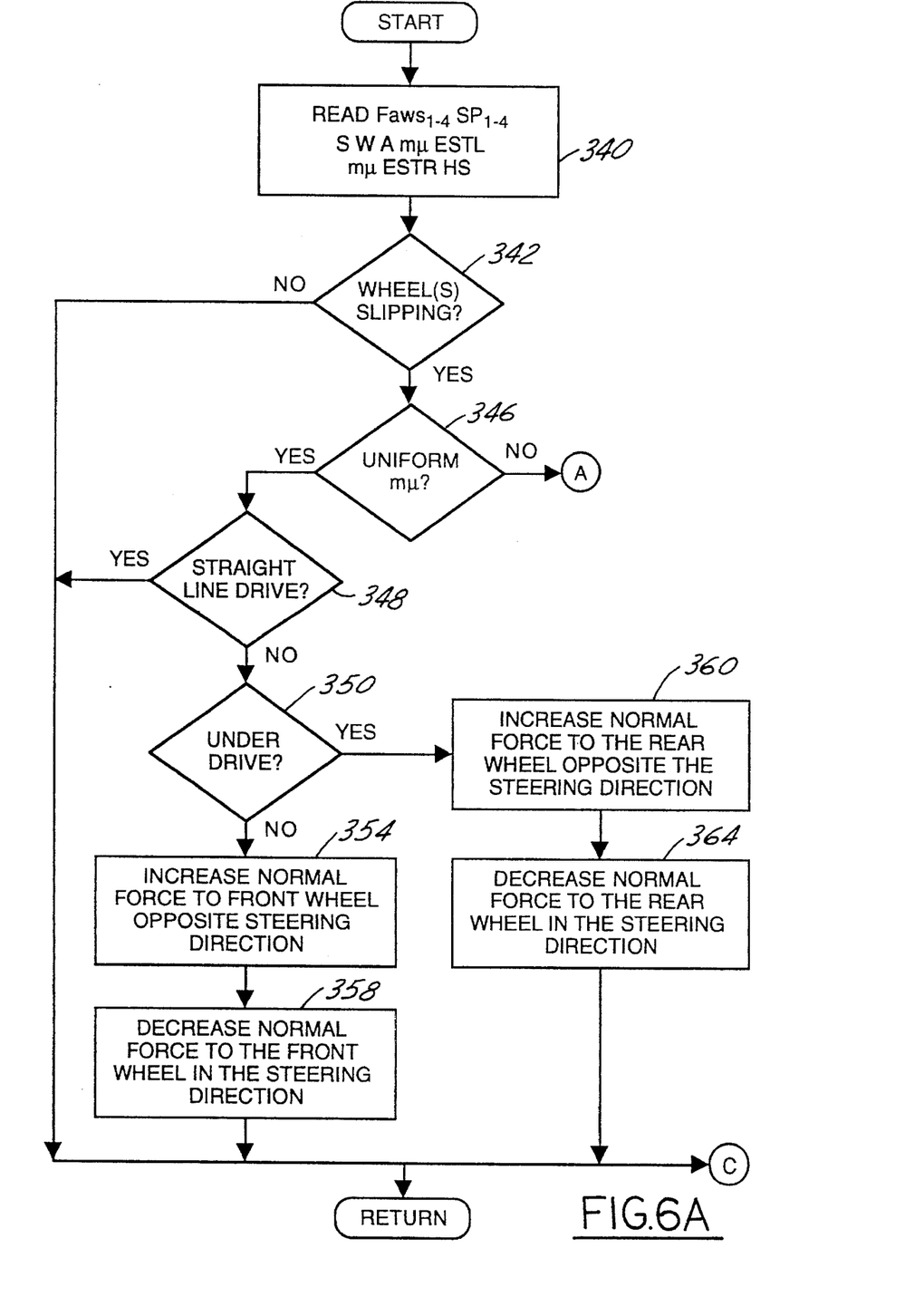
Figure 6B:
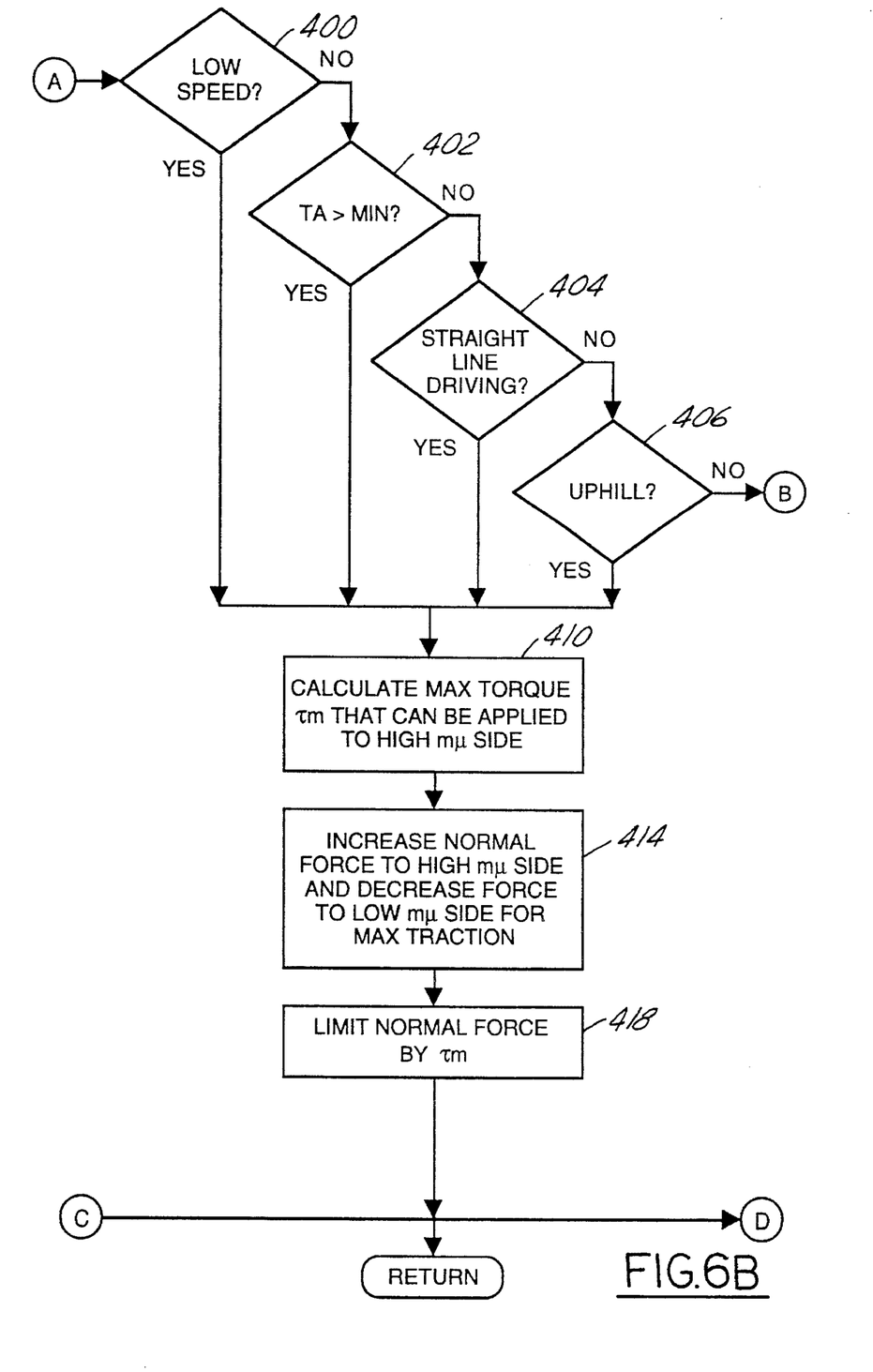
Figure 6C:
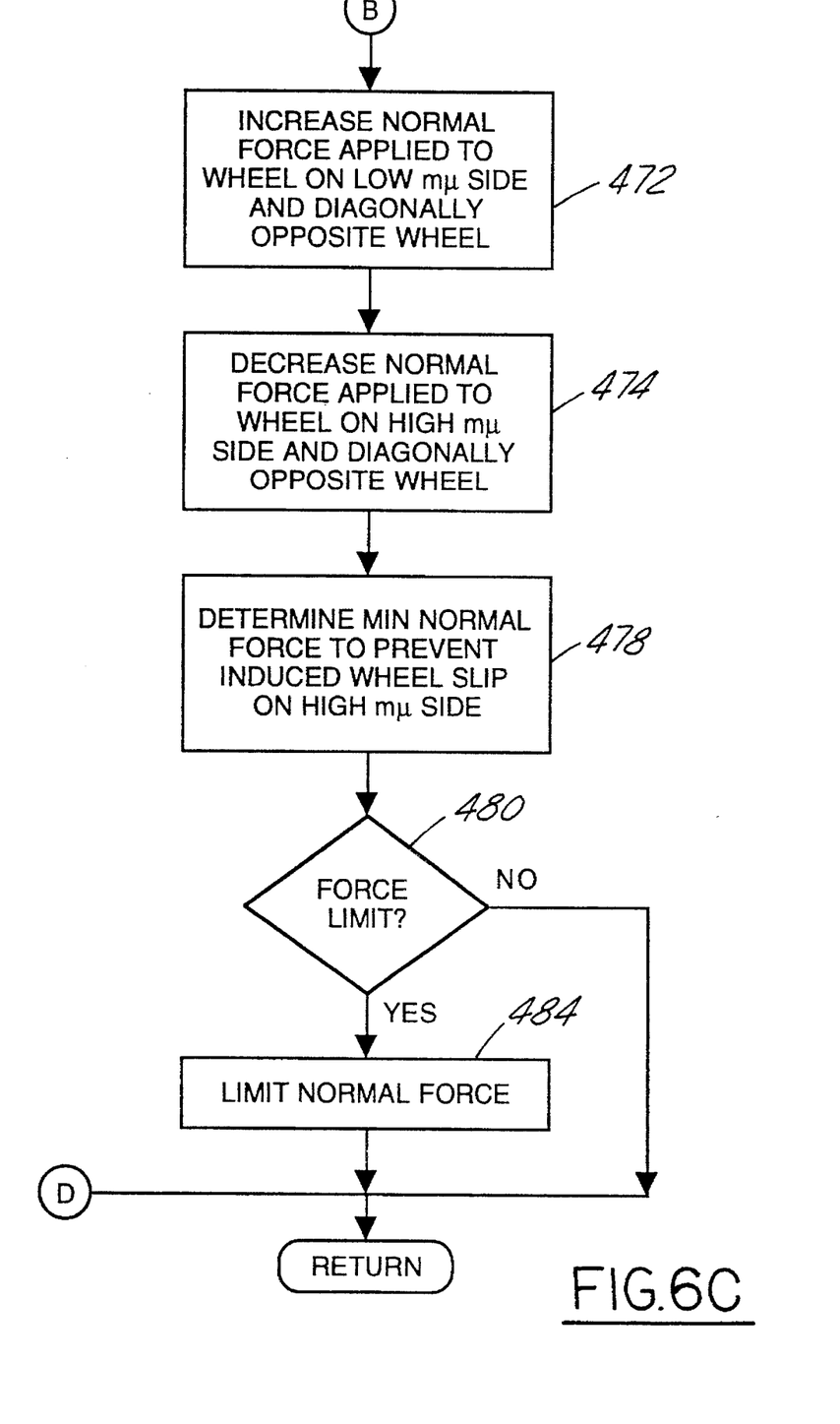

In the event none of the maximum accelerating conditions are present (steps 400–406), then the subroutine described in steps 472–484 of FIGS. 6A–6C is entered to control wheel slip for maximum vehicle stability. These steps are the same as previously described with reference to steps 272–284 of FIGS. 5A–5B and need not be repeated again in detail.

In the particular example presented herein with reference to the subroutines described in both FIGS. 5A–5B and 6A–6C, the normal forces are increased or decreased as a linear function of wheel slippage. Those skilled in the art, however, will recognize that other than linear relationships may be used to advantage. For example, a nonlinear relationship having a greater change in force with a greater degree of wheel slippage may be used to advantage. In the particular example presented herein, the increase in normal force is balanced by an equal and corresponding decrease in normal force on the other wheels as previously described. A different relationship may also be used to advantage between the increased and decreased forces.

This concludes the description of the preferred embodiment. The reading of it by those skilled in the art will bring to mind many alterations and modifications without departing from the spirit and scope of the invention. For example, active suspension systems other than the hydraulic assemblies shown herein may be used to advantage. Accordingly, it is intended that the invention only be limited by the following claims.

What is claimed:

1. A method for controlling wheel slip of a motor vehicle having an active suspension system applying a normal force to each wheel of the motor vehicle, comprising the steps of:

detecting wheel slip of one of the wheels;

increasing the normal force applied from the suspension system to said slipping wheel and concurrently decreasing the normal force to the wheel laterally opposite said slipping wheel in response to said wheel slip detection; and increasing the normal force applied from the suspension system to the wheel diagonally opposite said slipping wheel in response to said wheel slip detection.

2. The method recited in claim 1 further comprising a step of decreasing the normal force applied from the suspension system to the wheel longitudinally opposite said slipping wheel in response to said wheel slip detection.

3. The method recited in claim 2 wherein said increases in normal forces are substantially equal.

4. The method recited in claim 3 wherein said increase in normal forces is substantially equal to said decrease in normal force.

5. A method for controlling wheel slip of a motor vehicle having at least one driven wheel coupled to an internal combustion engine and an active suspension system for applying a normal force to each wheel, comprising the steps of:

detecting wheel slip of one of the wheels;

increasing the normal force applied to said slipping wheel and concurrently decreasing the normal force applied to the wheel laterally opposite said slipping wheel in response to said detected wheel slip;

limiting said decrease in normal force to prevent slipping of said laterally opposite wheel; and estimating a minimum normal force applied to said laterally opposite wheel based upon a ratio of road coefficient of friction encountered by said slipping wheel and said laterally opposite wheel.

\* \* \* \* \*